(12) United States Patent
Aminov et al.

(10) Patent No.: US 7,945,264 B2
(45) Date of Patent: May 17, 2011

(54) MOBILE STATION, SYSTEM AND METHOD FOR USE IN CELLULAR COMMUNICATIONS

(75) Inventors: Imanuel Aminov, Petah Tikva (IL); Inna Kogan, Kfar-Saba (IL); Boaz Or-Shraga, Petah-Tikva (IL); Menahem Raif, Rishon Letzion (IL)

(73) Assignee: Motorola Solutions, Inc., Schaumburg, IL (US)

( * ) Notice: Subject to any disclaimer, the term of this patent is extended or adjusted under 35 U.S.C. 154(b) by 896 days.

(21) Appl. No.: 11/759,684

(22) Filed: Jun. 7, 2007

(65) Prior Publication Data
US 2007/0232302 A1    Oct. 4, 2007

Related U.S. Application Data (63) Continuation of application No. PCT/US2005/044785, filed on Dec. 8, 2005.

(30) Foreign Application Priority Data

Dec. 8, 2004 (GB) .................................. 0426897.5

(51) Int. Cl.
*H04W 36/00* (2009.01)
(52) U.S. Cl. ........ 455/436; 455/433; 455/437; 455/442; 455/449
(58) Field of Classification Search .................. 370/331; 455/422.1, 432.1, 433, 435.1, 435.2, 435.3, 455/435.4, 435.5, 436
See application file for complete search history.

(56) References Cited

U.S. PATENT DOCUMENTS

| | | | | |
|---|---|---|---|---|
| 6,021,122 A | * | 2/2000 | Tiedemann, Jr. | 370/331 |
| 6,067,460 A | * | 5/2000 | Alanara et al. | 455/574 |
| 6,195,551 B1 | | 2/2001 | Kim | |
| 6,320,855 B1 | | 11/2001 | Shi | |
| 6,560,458 B1 | | 5/2003 | Ronkko | |
| 6,792,284 B1 | * | 9/2004 | Dalsgaard et al. | 455/525 |

(Continued)

FOREIGN PATENT DOCUMENTS

GB    2346295    2/2000

OTHER PUBLICATIONS

PCT Search Report Dated Nov. 20, 2007.

(Continued)

*Primary Examiner* — Kent Chang
*Assistant Examiner* — Dinh P Nguyen
(74) *Attorney, Agent, or Firm* — Randi L. Karpinia; Anthony P. Curtis

(57) ABSTRACT

A mobile station (107, 200) for use in a cellular communication system (100) includes a processor (214) operable to determine whether the mobile station should undergo cell re-selection by handover from a first base station (101) to a second base station (102), wherein the determination includes comparing a value of a property (RSSI) of a signal received from the second base station with a value of the same property of a signal received from the first base station and calculating whether the difference between the two values is greater than a pre-determined reference difference (SRH), characterised in that the processor is operable to apply in the difference calculation a reference difference (SRH(0), SRH(1) . . . ) which varies as a function of time during an idle mode of operation of the mobile station. Also disclosed is a system and method incorporating the mobile station.

22 Claims, 4 Drawing Sheets

U.S. PATENT DOCUMENTS

| | | | |
|---|---|---|---|
| 2001/0031638 A1 | 10/2001 | Korpela | |
| 2002/0102977 A1 | 8/2002 | Shi | |
| 2004/0127163 A1* | 7/2004 | Schramm et al. | 455/67.11 |
| 2004/0152481 A1 | 8/2004 | Georgeaux | |
| 2004/0162075 A1* | 8/2004 | Malladi et al. | 455/442 |
| 2004/0214575 A1 | 10/2004 | Jovanovic | |

OTHER PUBLICATIONS

GB Search Report Dated Apr. 14, 2005.

Supplementary European Search Report Dated Nov. 11, 2009.

Pollini G.P. "Trends in Handover Design", IEEE Communications Magazine, IEEE Service Center, Piscataway, US vol. 34, No. 3, Mar. 1, 1996, pp. 82-90, XPOOO557380, ISSN:0163-6804.

"Universal Mobile Telecommunications System (UMTS); User Equipment (UE) Procedures in Idle Mode and Procedures for Cell Reselection in Connected Mode (3GPP TS 25, 304, Version 6.3.0 Release 6); ETSI TS 125 304", ETSI Standards, Lis, Sophia Antipolis Cedex, France, vol. 3-R2, No. V6.3.0, Sep. 1, 2004, XP014016752, ISSN:0000-0001.

Korean Rejection Dated Dec. 26, 2008.

* cited by examiner

MOBILE STATION, SYSTEM AND METHOD FOR USE IN CELLULAR COMMUNICATIONS

This application is a continuation of and claims the benefit of priority to international application Serial No. PCT/US2005/044785 filed on Dec. 8, 2005, which claims the benefit of priority to Great Britain application Serial No. 0426897.5 filed on Dec. 8, 2004. Both of these applications are assigned to Motorola, Inc.

FIELD OF THE INVENTION

The present invention relates to a mobile station, a system and a method for use in cellular communications. In particular, the invention relates to cell re-selection by a mobile station operating in a mobile communications system.

BACKGROUND OF THE INVENTION

A cellular or trunked communication system is one in which mobile or portable user terminals, such as mobile telephones or portable radios, herein collectively referred to as 'mobile stations', can communicate via a network infrastructure which generally includes a plurality of fixed base stations (base transceiver stations). Each base station has one or more transceivers which serve mobile stations in a given region or area, known as a 'cell' or 'site', by radio communication. The cells of neighbouring base stations are often overlapping.

Generally, it is desirable for the mobile stations to be served by the base station which can provide the best service which includes good signals to and from the mobile station. Since mobile stations can move from one region to another it is known for the mobile stations to monitor signals from different base stations, to operate a procedure to determine which base station can best serve the mobile station, to determine whether it would be worthwhile to switch from a current serving base station to another one and if appropriate to carry out such a switch. In the art, the procedure to monitor for and to make determinations regarding a possible switch is known as a 'cell re-selection' procedure. The procedure to carry out a switch using such a determination is known as 'handover' or 'handoff'.

Such a cell re-selection procedure is operated in various cellular or trunked systems, e.g. in TETRA systems, i.e. those that operate in accordance with TETRA (Terrestrial Trunked Radio) standards defined by the European Telecommunications Institute (ETSI). In TETRA systems, each base station continuously broadcasts to mobile stations served by that station information relating to neighbour base stations which could serve the mobile stations. The information is broadcast on a control channel. The information includes channel frequencies and other data which allows each mobile station easily to search for other base stations in a scanning operation. Each mobile station runs an algorithm which produces and records link measurements between the mobile station and the neighbour base stations. These measurements are based on recorded received signal strength (energy) values. The algorithm uses the measurements plus some service parameters (such as local site trunking availability, subscriber class served, class of security available, and level of cell services available) to build a list of selected neighbour cells in a preferred order. When the mobile station determines that the link with the current serving base station should be exchanged with a better link it abandons the link with current serving base station and undergoes handover to the selected neighbour base station which is top of the compiled list.

In the known procedure for TETRA systems, the decision as to whether the mobile station should undergo cell handover to a selected neighbour base station is based on a comparison between the received signal strength ESRV (on an energetic basis) from the serving base station and the received signal strength ENGB from the selected neighbour base station. Two conditions have to be met using these measurements. Firstly, the measured value of ESRV has to be less than a pre-determined threshold. Secondly, the measured value of ENGB has to be greater than ESRV by an amount equal to or greater than a pre-determined reference difference known as the 're-selection hysteresis'. Generally, the hysteresis is used by the system to avoid situations in which the mobile station flips its attachment back and forth between two base stations as its serving base station. The pre-determined threshold and the re-selection hysteresis are different, in the two cases in which (i) the mobile station is in an idle mode, i.e. not actively participating in a call, and (ii) the mobile station is in a call-active mode in which it is actively participating in a call. The pre-determined threshold and the re-selection hysteresis are constants for each mode but are greater in mode (i) than in mode (ii). The reason for this is that when a call is established it is considered better to maintain it with marginal link conditions rather than interrupt the call to allow handover to take place.

SUMMARY OF THE INVENTION

The way in which the known cell re-selection procedure is carried out is considered by the present inventors not to be ideal and capable of improvement. The purpose of the present invention is therefore to provide an improved cell re-selection procedure as well as system components to carry out the improved procedure.

According to the present invention in a first aspect there is provided a mobile station as defined in claim 1 of the accompanying claims.

According to the present invention in a second aspect there is provided a system as defined in claim 18 of the accompanying claims.

According to the present invention in a third aspect there is provided a method as defined in claim 22 of the accompanying claims.

Further features of the invention are as defined in the accompanying dependent claims and in the embodiments of the invention described later.

By the invention, a reference difference used in a cell re-selection determination in idle mode is not constant but is varied with time, e.g. is reduced constantly or in steps. As explained in more detail later, this beneficially increases the probability of starting a call using the best base station link available and thereby reduces the probability of a cell re-selection and handover occurring during a call and avoids the undesirable interruption to service caused by such a handover.

DESCRIPTION OF EMBODIMENTS OF THE INVENTION

Figure 1:
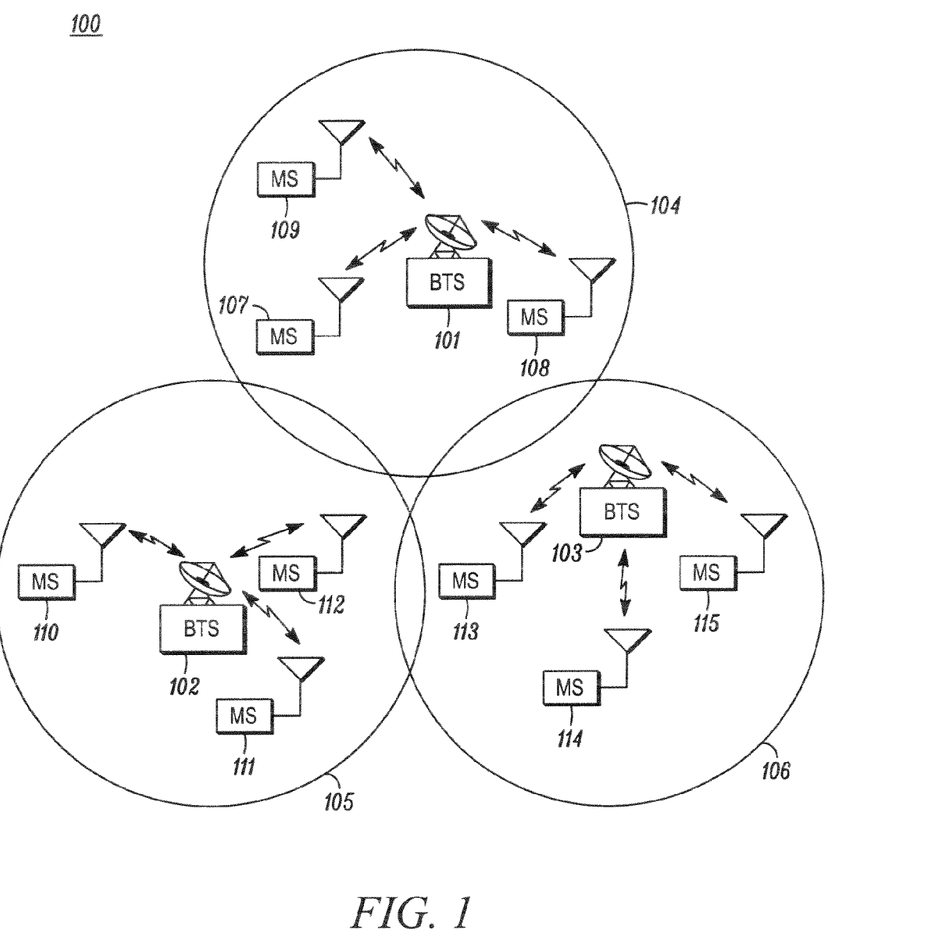
FIG. 1 is a schematic diagram of an arrangement of terminals in a mobile communication system.

FIG. 1 illustrates an arrangement of units in a mobile (cellular) radio communication system 100 operating in accordance with TETRA standards. There is a plurality of base stations (base transceiver stations, BTS) three of which are shown namely base stations 101, 102 and 103. Each of the base stations serves mobile stations within its service area or cell. The base station 101 generally serves a cell 104. The base station 102 generally serves a cell 105. The base station 103 generally serves a cell 106. Three mobile stations, namely mobile stations 107, 108 and 109 are shown within the cell 104 served by the base station 101. Three further mobile stations, namely mobile stations 110, 111 and 112 are shown within the cell 105 served by the base station 102. Three mobile stations, namely mobile stations 113, 114 and 115 are shown within the cell 106 served by the base station 103. The mobile stations 107, 108 and 109 are able to communicate with each other via their serving base station 101. The mobile stations 107, 108 and 109 are able to communicate with mobile stations served by other base stations via the base station 101 and the appropriate other base station(s) via a link between the base station(s). Thus, the mobile station 107 can communicate with the mobile station 110 via the base station 101 and the base station 102.

Figure 2:
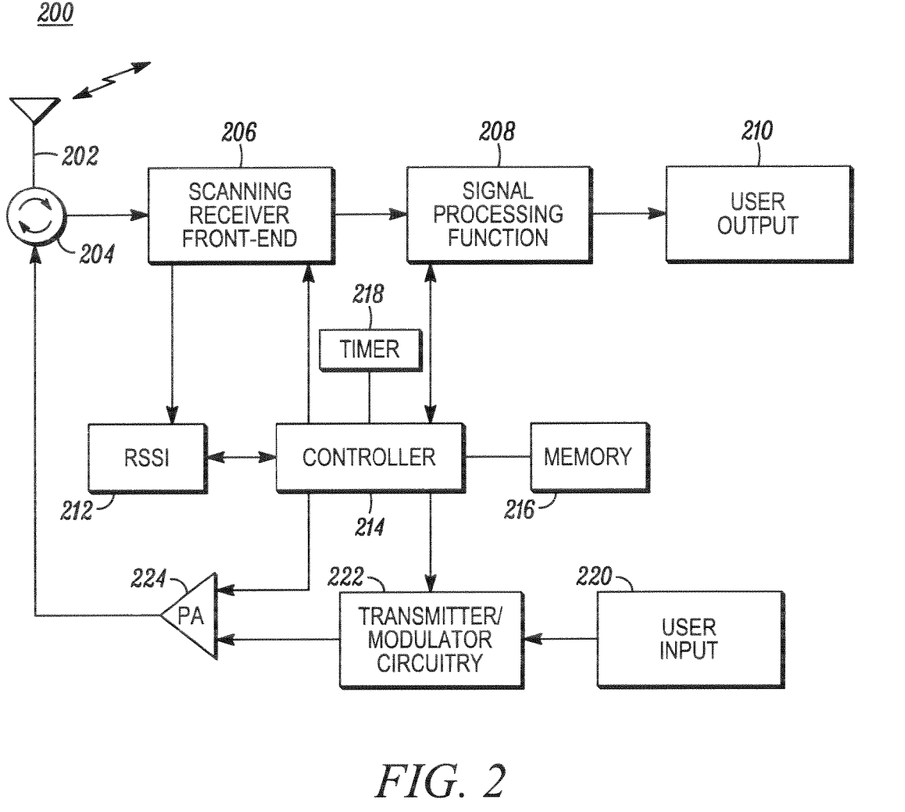
FIG. 2 is a block schematic diagram of an arrangement of components in a mobile station as shown in FIG. 1.

FIG. 2 shows an arrangement 200 of the main functional components of a mobile station, e.g. the mobile station 107, in the system 100 of FIG. 1. The arrangement includes an antenna 202 coupled to a circulator 204 (or switch or duplex filter) providing isolation between transmitter and receiver chains.

Incoming signals from the antenna 202 are passed via the circulator 204 to a receiver chain which includes a scanning receiver front-end which comprises circuitry which provides reception, filtering and down-conversion to base-band frequency signals. The scanning receiver front-end 206 can be used to provide foreground scanning when the mobile station is not participating in a call (as defined later). The scanning receiver front-end 206 is serially coupled to a signal processing function 208 which extracts information from the baseband signal recovered from the scanning receiver front-end 206. The signal processing function 208 operates under control of a controller 214 which generally controls all functional operations in the mobile station arrangement 100. The controller 214 is a programmed digital signal microprocessor. Output information from the signal processing function 208 is provided to a user at a user interface output 210 which may for example comprise a speaker and/or a visual display, depending on the type of information (e.g. speech, data, picture, video etc) to be output.

A RSSI (received signal strength indicator) 212 is also connected to the scanning receiver front-end 206. The RSSI 212 measures the strength (energy) of a received signal in a known manner and provides an input to the controller 214 giving information on the RSSI of a currently received signal.

Coupled to the controller 214 is a memory 216 which stores data and programs needed for use by the controller 214. A timer 218 is coupled to the controller 214 to control timing of operations within the arrangement 200.

The transmitter chain of the arrangement 200 includes a user input 220 such as a microphone, keypad, camera etc. The user input 220 provides input information or data to be communicated from a user and is connected in turn to a transmitter/modulation circuitry 222 and a power amplifier (PA) 224, both of which are under the control of the controller 214. An output from the power amplifier 224 is provided as an output signal for radio transmission by the antenna 202 and is provided to the antenna 202 via the circulator 204.

The various components within the arrangement 200 can be realised in a discrete or integrated form.

Referring back to FIG. 1, if say the mobile station 107 moves nearer the base stations 102 and 103, its signals to and from the base station 101 will gradually become weaker and it will be desirable for the mobile station 107 to monitor whether it should undergo a cell re-selection and become attached for service to another base station such as the base station 102 or the base station 103. Monitoring for potential cell re-selection and execution of cell re-selection is carried out by one of the mobile stations such as the mobile station 107 in accordance with an embodiment of the present invention in the following manner.

Firstly, there is a determination by the controller 214 of the mobile station 104 as to whether the mobile station 104 is currently in an idle mode or in a call mode. In an idle mode, the mobile station 104 is periodically sending and receiving control signals relating to its active presence in the system 100 on a control channel of the system 100, but is not actively sending or receiving a traffic signal relating to user information, e.g. user speech, data, picture, video or other user communicated information. In contrast, in a call-active mode, the mobile station is taking part in an active communication, usually on a traffic channel, or is in the process of establishing or being established in such a communication.

Figure 3:
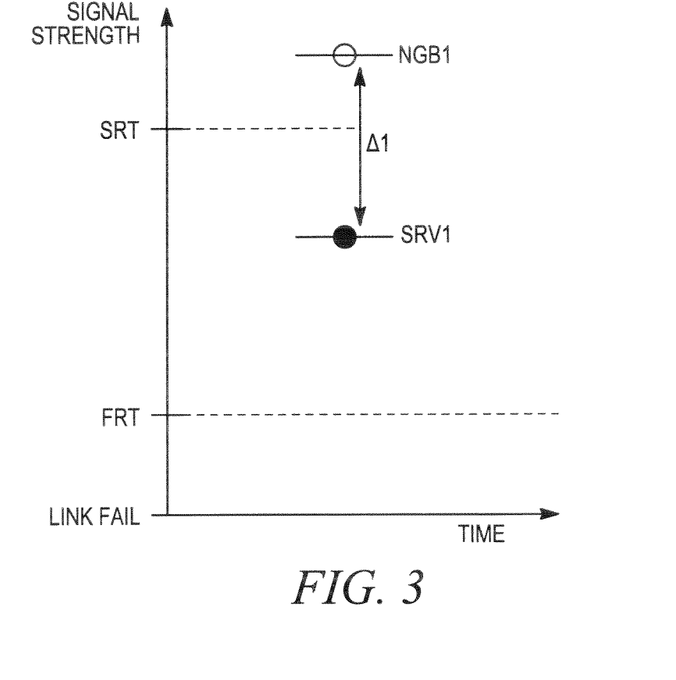
FIG. 3 is a graph of received signal strength versus time illustrating how cell re-selection is carried out in the mobile station of FIG. 2 when in an idle mode using a known procedure.

FIG. 3 illustrates how the cell re-selection procedure operates when the mobile station 107 is in an idle mode in the TETRA system of FIG. 1. It is assumed that the mobile station 107 has already identified which of the base stations not currently serving the mobile station 107 is a preferred non-serving base station by a known selection procedure using one or more of the known selection parameters described above. The signal strength of received signals from the currently serving base station 101 and the selected non-serving base station, say base station 102, are monitored by the RSSI 212 (FIG. 2) and the measured results are provided to the controller 214. The vertical axis of FIG. 3 represents signal strength ('energetic grade', e.g. in db. The horizontal axis in FIG. 3 is time (although in FIG. 3 only one plotted value is shown for simplicity). The controller 214 of the mobile station 107 monitors whether the signal strength ('energetic grade') SRV of the received signal in idle mode from the serving base station 101 is above or below a pre-determined threshold SRT the value of which is held in the memory 216. When the measured signal strength SRV falls below the threshold SRT a first condition for re-selection in idle mode is satisfied.

The difference Δ1 between: (i) the signal strength ('energetic grade') NGB1 from the base station not currently serving the mobile station 107, but selected as the 'best', say from the base station 102; and (ii) the signal strength ('energetic grade') SRV1 from the base station 101 currently serving the mobile station 104; is monitored. If or when the value of the monitored difference Δ1 between the two signal strengths becomes greater than a pre-determined difference value, called a 'slow reselect hysteresis', SRH, and the signal strength NGB1 from the non-serving base station 102 is greater than the signal strength SRV1 from the serving base station 101, a second condition for cell re-selection in idle mode is satisfied.

When both the first and second conditions for re-selection are satisfied, the mobile station 107 then begins to undergo cell handover to be served by the base station 102 in a known manner.

For comparison purposes, FIG. 3 shows another threshold, the 'fast reselect threshold' or FRT, which is used in cell re-selection in call-active mode, now to be described. It will be seen that the value of FRT is significantly less than that of SRT.

Figure 4:
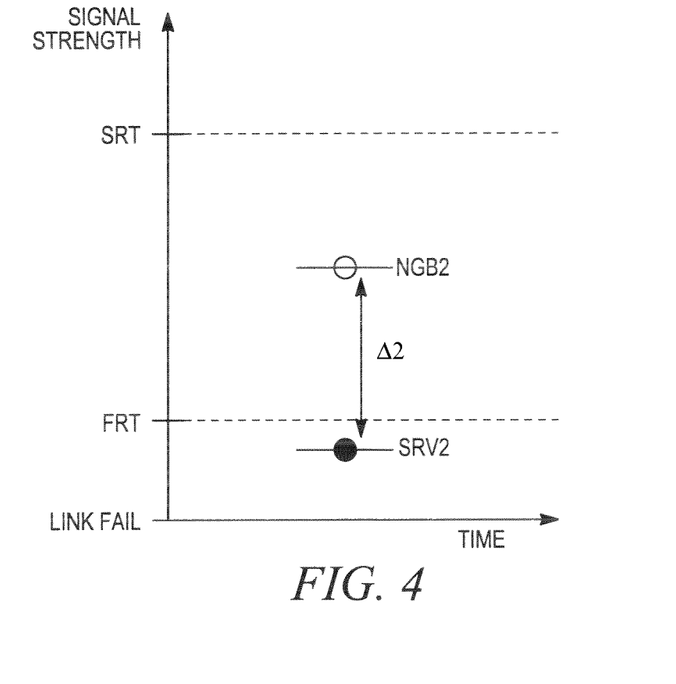
FIG. 4 is a graph of received signal strength versus time illustrating how cell re-selection is carried out in the mobile station of FIG. 2 when in a call-active mode using a known procedure.

FIG. 4 illustrates how the cell re-selection procedure operates when the mobile station 107 is in a call-active mode. Again, it is assumed that the mobile station 107 has already identified which of the base stations not currently serving the mobile station 107 is its preferred non-serving base station by a known selection procedure using one or more of the known selection parameters described above. The signal strength of received signals from the currently serving base station 101 and the selected non-serving base station, base station 102, are again monitored by the RSSI 212 (FIG. 2) and the measured results are provided to the controller 214. For example, in a TDMA (time divided multiple access) system such as a TETRA system wherein call information is carried in a designated TDMA slot or slots, the monitoring of received signal strength, in which the RF carrier energy is measured, may take place during any TDMA slot, particularly a slot in which call information is not carried. The vertical axis of FIG. 4 represents signal strength ('energetic grade', e.g. in db. The horizontal axis represents time (although in FIG. 4 only one plotted value is shown for simplicity). The controller 214 of the mobile station 107 monitors whether the signal strength ('energetic grade') SRV2 of the received signal in call-active mode from the serving base station 101 is above or below the pre-determined threshold FRT (previously seen in FIG. 3) the value of which is held in the memory 216. When the measured strength 201 falls below the threshold FRT a first condition for re-selection in call-active mode is satisfied.

The difference $\Delta 2$ between (i) the signal strength ('energetic grade') NGB2 from the selected base station 102 not currently serving the mobile station 107 and (ii) the signal strength ('energetic grade') SRV2 from the base station 101 currently serving the mobile station 107 is monitored. If or when the value of the monitored difference $\Delta 2$ between the two signal strengths becomes greater than a pre-determined difference value, called a 'fast reselect hysteresis', FRH, and the signal strength NGB2 from the non-serving base station 102 is greater than the signal strength SRV2 from the serving base station 101, a second condition for cell re-selection in call-active mode is satisfied.

When both the first and second conditions for re-selection in call-active mode are satisfied, the mobile station 107 then begins to undergo cell handover to be served by the base station 102 in a known manner.

After cell re-selection and handover, the signal strength of received signals from candidate serving base stations, including the currently serving base station 101, continue to be monitored both during idle mode and call-active mode in case a further cell handover is needed by virtue of further movement of the mobile station 107.

Figure 5:
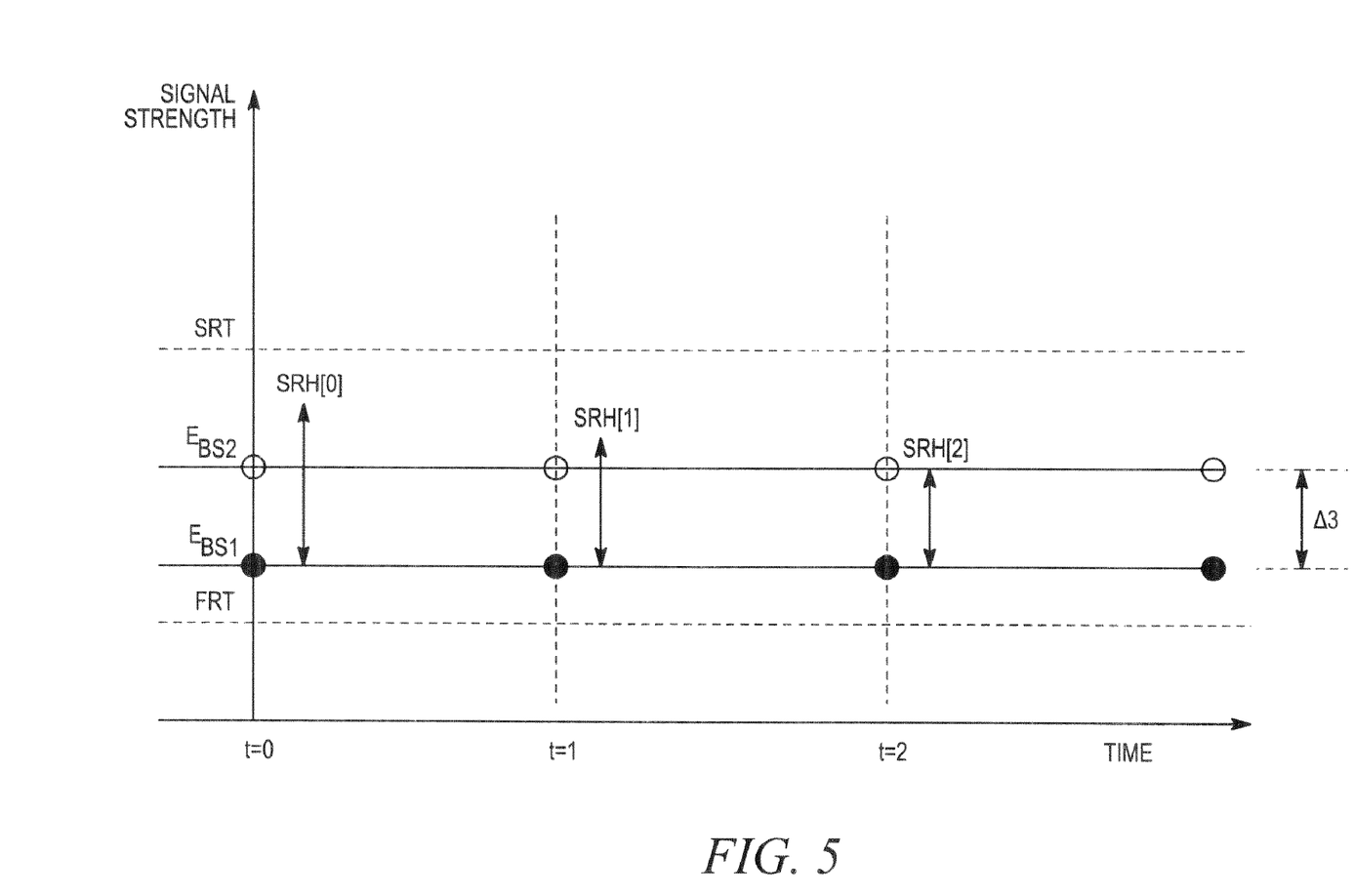
FIG. 5 is a graph of received signal strength versus time illustrating how cell re-selection is carried out in the mobile station of FIG. 2 when in an idle mode using an improved procedure embodying the invention.

FIG. 5 shows how an embodiment of the invention is applied in the mobile station 107 operating again in idle mode. In this case the events at times t=0, t=1, t=2, are shown in FIG. 5. The units of t may for example be seconds. In this case the values of FRT and SRT are the same as in FIG. 3. There are two base stations of interest, BS1 and BS2. Say, for example that BS1 is the base station 101 of FIG. 1 and BS2 is the base station 102 of FIG. 1. The signal strengths in idle mode from the two base stations BS1 and BS2 respectively are EBS1 and EBS2. It will be seen that EBS1 and EBS2 are below SRT which satisfies the first condition for cell re-selection in idle mode. EBS2 is greater than EBS1. Initially, at time t=0, BS1 is the serving base station. The value of the slow re-selection hysteresis SRH is set by the controller 214 (FIG. 2) working in conjunction with the memory 216 and the timer 218 at a relatively large value SRH(0) which is greater than the difference $\Delta 3$ between EBS2 and EBS1. At time t=0 the second condition for cell re-selection in idle mode is not met.

At a time t=1, BS1 is still the serving base station. The value of the slow re-selection hysteresis SRH is now set by the controller 214 (FIG. 2) working in conjunction with the memory 216 and the timer 218 at a value SRH(1) less than the value SRH(0). However, the value SRH(1) is still greater than the difference $\Delta 3$ between EBS2 and EBS1. Thus, at time t=1 the second condition for cell re-selection in idle mode is still not met.

At a time t=2, the value of the slow re-selection hysteresis SRH is now set by the controller 214 (FIG. 2) working in conjunction with the memory 216 and the timer 218 at a value SRH(2) which is smaller the value SRH(1). The value SRH(2) is now not less than the difference $\Delta 3$ between EBS2 and EBS1. Thus, at time t=2 the second condition for cell re-selection in idle mode is met and the mobile station begins handover to be served by base station BS2. In addition, the base station BS1 becomes the non-serving base station currently providing the best signal strength.

The parameters SRT, SRH, FRT, FRH are generally configured by the system infrastructure, e.g. at the serving base station, taking into account an overall service coverage plan of the system. MSs receive the values of these parameters via broadcast messages on a system control channel from their serving base station. Therefore, in the procedure illustrated in FIG. 3, SRH is preferably equal to the SRH value broadcast by the currently serving base station 101 to fulfil the original system coverage plan. There are situations, however, in which $\Delta 1$ is in the range $0<\Delta 1<SRH$ for a relatively long time. Thus, if SRH remains constant as in the prior art, handover to a better cell, although desirable, is not initiated. Then, when a call starts on the original cell, the MS will maintain the call until the signal strength falls below the level of FRT (FIG. 4), which may happen quickly. A typical value of SRH is between 6 db and 12 db, e.g. between 8 and 10 db.

In the embodiment described with reference to FIG. 5, the initial value of SRH, SRH(0), is again preferably the broadcast value received. However, in accordance with an embodiment of the invention, the value of SRH is gradually reduced with time to an eventual minimum value of SRH, namely $SRH_{min}$. A suitable value of $SRH_{min}$ is between 4 db and 2 db, e.g. 3 db. Preferably, $SRH_{min}$ is less than half SRH(0). If a situation exists wherein 3 db<$\Delta 3$<SRH(0) for a relatively long time (e.g. 15-30 sec), the MS may re-select using the reducing value of SRH to a cell that offers a significantly better signal energy than the current serving cell. This will give the MS a better starting point (much above FRT) to establish and maintain a call when it goes into call-active mode.

The invention claimed is:

1. A mobile station for use in a cellular communication system, the mobile station including a processor operable to determine whether the mobile station should undergo cell re-selection by handover from a first base station to a second base station, wherein the determination includes comparing a value of a property of a signal received from the second base station with a value of the same property of a signal received from the first base station and applying a difference calculation to determine whether the difference between the two values is greater than a pre-determined reference difference, wherein the processor is operable to apply in the difference calculation a reference difference which varies as a function of time during an idle mode of operation of the mobile station.

2. A mobile station according to claim 1 wherein the processor is operable to apply in the difference calculation a reference difference whose value is reduced with time.

3. A mobile station according to claim 1 wherein the processor is operable to apply in the difference calculation a reference difference whose value varies continuously with time.

4. A mobile station according to claim 1 wherein the processor is operable to apply in the difference calculation a reference difference whose value varies in steps in time.

5. A mobile station according to claim 1 wherein the compared values are received signal strength values and the processor is operable to apply a varying reference difference value of received signal strength.

6. A mobile station according to claim 5 wherein an initial value of the reference difference is a value specified in a broadcast signal received from a serving base station.

7. A mobile station according to claim 5 wherein the processor is operable to reduce the reference difference from an initial value of between 6 db and 10 db and toward a minimum value of between 2 db and 4 db.

8. A mobile station according to claim 7 wherein the minimum value of the reference difference is less than half the initial value of the reference difference.

9. A mobile station according to claim 1 wherein the processor is operable to apply in the difference calculation a first reference difference during a period when the mobile station is in an idle mode and a second reference difference smaller than an initial value of the first reference value during a period when the mobile station is taking part in a call.

10. A mobile station according to claim 1 wherein the processor is operable to carry out the cell re-selection determination also by carrying out a threshold comparison calculation in which the processor calculates whether a value of a property of a signal received from the first base station is below a pre-determined threshold value.

11. A mobile station according to claim 10 wherein the processor is operable to apply in the threshold comparison calculation a threshold value which has a first value when the mobile station is in an idle mode and a second lower value when the mobile station is taking part in a call.

12. A mobile station according to claim 10 wherein the processor is operable to apply in the threshold comparison calculation a value of measured signal strength of a signal from the first base station and a threshold signal strength value.

13. A mobile station according to claim 1 which is operable according to TETRA standards.

14. A mobile station according to claim 13, wherein the reference difference is a slow re-selection hysteresis.

15. A mobile station according to claim 13 wherein the processor is operable to carry out the cell re-selection determination also by carrying out a threshold comparison calculation in which the processor calculates whether a value of a signal strength of a signal received from the first base station is below a pre-determined threshold value, wherein the pre-determined threshold value is a slow re-selection threshold.

16. A mobile station according to claim 1 wherein the processor is operable to initiate cell handover when the processor has determined that one or more cell re-selection conditions have been satisfied.

17. A mobile communication system including a first base station, a second base station and a plurality of mobile stations, wherein at least one of the mobile stations includes a processor operable to determine, when the mobile station is currently served by the first base station, whether the mobile station should undergo cell re-selection by handover from the first base station to the second base station, wherein the determination includes comparing a value of a property of a signal received from the second base station with a value of the same property of a signal received from the first base station and calculating whether the difference between the two values is greater than a pre-determined reference difference, wherein the processor is operable to apply in the difference calculation a reference difference which varies as a function of time during an idle mode of operation of the mobile station.

18. A system according to claim 17, wherein the property comprises signal strength of the signal received at the mobile station and the second base station has been determined by the processor of the mobile station to be a neighbouring base station currently which can provide the best service to the mobile station.

19. A system according to claim 17, wherein the system operates in accordance with TETRA standards.

20. A method of operation in a mobile communication system including a first base station, a second base station and a plurality of mobile stations, the method including determining, by a processor included in at least one of the mobile stations currently served by the first base station, whether the mobile station should undergo cell re-selection by handover from the first base station to the second base station, wherein the determination includes comparing a value of a property of a signal received from the second base station with a value of the same property of a signal received from the first base station and calculating whether the difference between the two values is greater than a pre-determined reference difference, wherein the processor applies in the difference calculation a reference difference which varies as a function of time during an idle mode of operation of the mobile station.

21. A method according to claim 20, wherein the property values used in the calculation by the processor are measured signal strengths of the signals received at the mobile station from the first and second base stations.

22. A method according to claim 20, wherein the method operates in accordance with TETRA standards.

* * * * *

UNITED STATES PATENT AND TRADEMARK OFFICE
CERTIFICATE OF CORRECTION

| | | |
|---|---|---|
| PATENT NO. | : 7,945,264 B2 | Page 1 of 1 |
| APPLICATION NO. | : 11/759684 | |
| DATED | : May 17, 2011 | |
| INVENTOR(S) | : Aminov et al. | |

It is certified that error appears in the above-identified patent and that said Letters Patent is hereby corrected as shown below:

On the Title Page, Item (75), under "Inventors", delete "Rishon Letzion" and insert -- Rishon Lezion --, therefor.

Signed and Sealed this
Eleventh Day of December, 2012

David J. Kappos
*Director of the United States Patent and Trademark Office*